April 8, 1958     L. A. PHILIPP     2,829,869
REFRIGERATING APPARATUS
Filed May 6, 1955
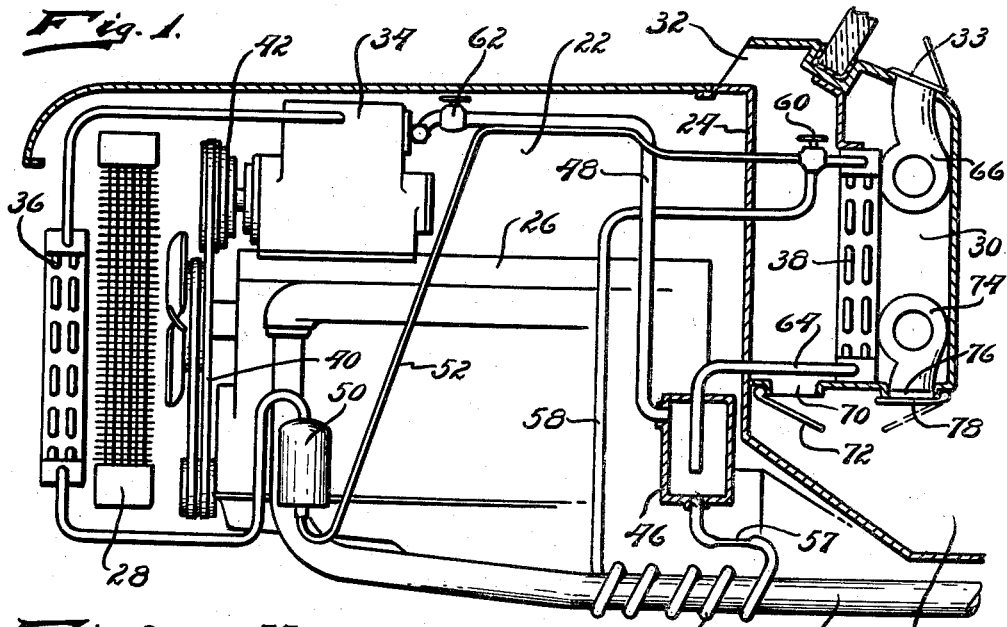
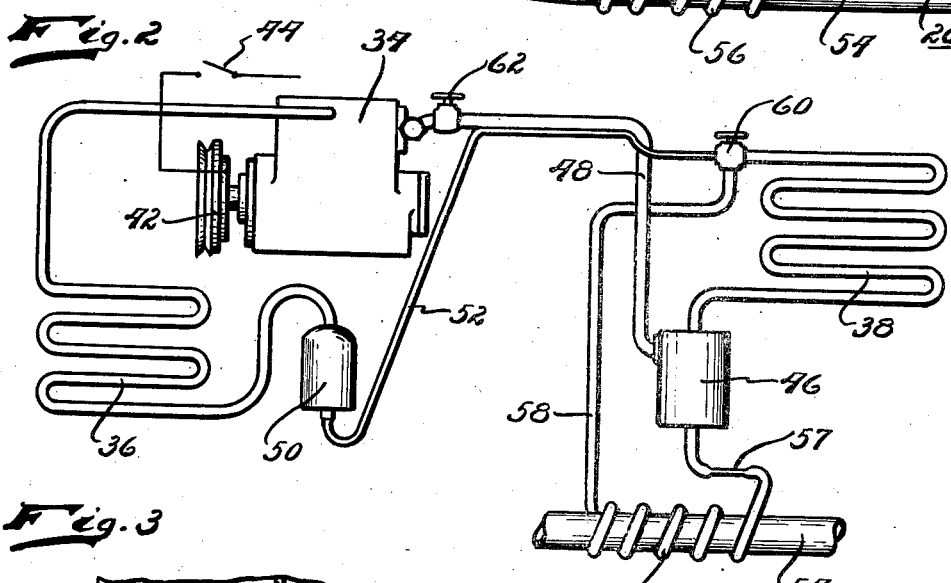
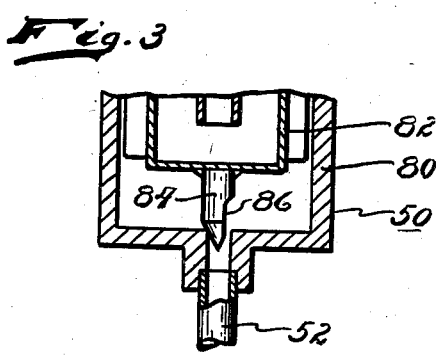
INVENTOR.
LAWRENCE A. PHILIPP
BY
Ralph E. Baker
ATTORNEY

United States Patent Office 2,829,869
Patented Apr. 8, 1958

2,829,869
REFRIGERATING APPARATUS

Lawrence A. Philipp, Detroit, Mich., assignor to American Motors Corporation, Detroit, Mich., a corporation of Maryland Application May 6, 1955, Serial No. 506,549

3 Claims. (Cl. 257—7)

This invention relates generally to air conditioning apparatus and particularly to such appaartus for the heating and the cooling of passenger compartments of motor vehicles.

One of the objects of my invention is to provide a secondary or closed flow volatile refrigerant system to receive waste heat from a motor vehicle and to conduct same to the air entering the vehicle passenger compartment.

Another object of my invention is to provide an improved refrigerating system for cooling air for passenger compartments of motor vehicles and make provisions for utilizing a portion of said system with an auxiliary evaporator to produce a secondary refrigerating system for heating air for such compartments.

Another object of my invention is to provide for the cooling or heating of a motor vehicle passenger compartment by an improved air conditioning system using a volatile refrigerant and an arrangement and connection of the system components to effect comfort heating or cooling.

Another object of my invention is to provide a motor vehicle air conditioning system of which a refrigerant evaporator component thereof for cooling in warm weather may be of such small size as to make its installation in the vehicle possible and practicable, yet function as an air heater in cold weather by an arrangement which will effect comfort heating of the relatively large passenger compartment.

Another object resides in the use of the waste exhaust heat of the vehicle engine to heat a volatile refrigerant together with an arrangement which balances the refrigerant pressures between the point of heat application and the air heater so that air enroute to the passenger compartment will be heated satisfactorily.

In the drawing:

Fig. 1 is a fragmentary view in cross section of a motor vehicle having an air conditioning system embodying features of my invention;

Fig. 2 is a diagrammatic illustration of the air conditioning system; and

Fig. 3 is an enlarged fragmentary view of a float valve of the system.

Referring to the drawing by characters of reference, the motor vehicle shown includes a passenger compartment 20, and an engine compartment 22 separated by a cowl dash panel 24. Within the engine compartment 22 is the usual internal combustion engine 26 and a radiator 28 of a cooling system for the engine. At the dash panel 24, within the passenger compartment 20, is an air conditioning compartment 30 having an upper air inlet 32 in the top of the cowl and an air outlet 33 into compartment 20.

Positioned within the vehicle is an air conditioning system which includes, in general, a refrigerant compressor 34, a refrigerant condenser 36 and a refrigerant coil 38. The coil 38 is a combination cooling and heating element. The compressor 34 is mounted on the engine 26, the condenser 36 is mounted in front of the engine radiator 28, and the coil 38 is mounted within the air conditioning compartment 30. The compressor 34 is driven by the engine 26 by pulleys and belt drive 40. A conventional magnetic clutch 42 may be employed between the compressor driven shaft and the engine 26 to start or stop operation of the compressor by the engine, and the magnetic clutch 42 may be controlled by a manual switch 44 at the will of the operator.

During operation of the compressor 34 by the engine 26 when the system is operating to cool the passenger compartment 20, evaporated refrigerant is withdrawn from the top of a refrigerant receiver 46 on the evaporator outlet, through a return conduit 48 by the compressor 34 which compresses the vaporous refrigerant and delivers it to the condenser 36 wherein the vaporous refrigerant is liquefied and delivered under the control of a high side float valve 50 and a small diameter tube 52 to the evaporator 38. The tube 52 is bonded to the return conduit 48 to be cooled thereby so as to prevent vaporization of the refrigerant passing therethrough, thus assuring that only liquid refrigerant enters evaporator 38. The tube 52 is of small diameter to keep the pressure up so that refrigerant expansion will not take place at the outlet of the high side float valve 50. Under these conditions, expansion of the refrigerant takes place at the inlet of the evaporator 38. The receiver or accumulator 46 prevents liquid refrigerant from being conducted to the compressor as it serves as a trap.

In accordance with my invention, to have an air conditioning system using a volatile refrigerant for comfort heating of the passenger compartment 20, I utilize an extraneous source of heat to heat the refrigerant to a higher temperature than any prevailing temperature in the system and arrange to circulate the refrigerant through the coil 38 to heat the compartment 20. Any suitable source of extraneous heat may be used, such as the exhaust pipe 54 of engine 26. Arranged in heat transfer relation with the exhaust pipe 54 is a heat absorber or evaporator coil 56 having one end connected to receiver 46 at the bottom thereof by a restricted conduit 57 and the other end connected directly to the inlet of coil 38 by a conduit 58. At the junction of conduits 52 and 58, a valve 60 is provided for closing off conduit 52 and opening conduit 58 and vice versa. Also, a valve 62 is provided in suction line 48 to close the same to flow during heating operation. Thus, when heating is desired, valve 62 is set to open conduit 58 and close restricted conduit 52, and valve 62 is closed to cut out the compressor 34. Under these conditions, hot refrigerant vapors flow from heated coil 56 directly to the coil 38 through conduit 58. The refrigerant vapors passing through coil 38 gives up heat to the air flowing over said coil which cools and condenses the refrigerant vapor. The condensed refrigerant enters receiver 46 whence it passes into evaporator coil wherein it is vaporized to again be recirculated. Thus it will be noted that during the heating operation the coils 38 and 56 together with the connecting conduits provide a secondary or closed flow volatile refrigerant system with the coil 56 serving as an evaporator and the coil 38 serving as a condenser. This enables the waste heat of the heat emitting part of the vehicle to be conducted to the air moving into the passenger compartment. At this time the compressor is disconnected from the engine as its operation is unnecessary.

During heating operation, the temperature of coil 56 and air heater coil 38 become substantially equal, thus providing the necessary high temperature at coil 38 for comfort heating of the passenger compartment 20. The receiver 46 functions as an accumulator or liquid refrigerant trap during the cooling operation and vaporous refrigerant is drawn from the coil 38 through a conduit 64 into the receiver below the liquid level therein to effect separation of vapor and liquid refrigerant so that only vaporous refrigerant is returned to the compressor 34 through conduit 48. For efficient heating purposes, the receiver 46 preferably has a capacity to hold a larger quantity of liquid refrigerant than the excess normally required for refrigerating purposes, the large excess being driven off and circulated between the heat source 54 and coil 38 during the heating operation.

During forward movement of the vehicle, air enters same by ram pressure through the cowl inlet 32 into compartment 30, over coil 38 which when functioning as an evaporator, cools the air which then flows through outlet passage 33 into the passenger compartment 20. A fan 66 in compartment 30 behind coil 38 aids to draw air into the vehicle and discharge the air into the passenger compartment 20 to air condition the same. In the bottom of compartment 30 is an air intake 70 for recirculation of passenger compartment air over the coil 38 and the air intake 70 may be provided with a suitable damper 72. A second fan 74 is provided within compartment 30 behind coil 38 for use during heating operation when the vehicle is not in motion. Fan 74 draws air over the coil 38, which is then functioning as a heater, and discharges the heated air downwardly through discharge 76 into the compartment 20. Air in the passenger compartment 20 may be recirculated over heated coil 38 through inlet 70 and out of discharge 76 and damper 78 may be provided for the hot air discharge 76.

For air conditioning of compartment 20 by cooling, valve 62 is set to allow refrigerant flow from receiver 46 to compressor 34 and valve 60 is set to stop flow from unrestricted conduit 58 to coil 38 and permit flow through restricted conduit 52. With the valves 60 and 62 set for cooling operation and with the engine 26 operating, the compressor 34 may be operated by the engine by closing switch 44 of the magnetic clutch 42. The fan 66 is placed in operation to air flow over the surface of evaporator 38 and the fan may be manually or thermostatically controlled, as desired. When the air passes over the surface of the evaporator 38, the refrigerant in the evaporator absorbs heat from the air which causes the refrigerant to vaporize. The vaporized refrigerant is withdrawn from the evaporator 38 by the compressor 34 which compresses the refrigerant and delivers it to the condenser 36 wherein the refrigerant is condensed and flows to the high side float control 50. The high side float 50 includes a casing 80 which houses a float bucket 82 which carries a valve proper 84 of the needle valve type. The valve 84 is machined or flattened on one side, as at 86, to provide a so-called cracked valve to provide an arrangement for unloading the compressor 34 when the compressor stops for any reason. During operating, liquid refrigerant enters the bucket 82 and overflows, causing the bucket to rise as the level of liquid rises in casing 80 to thus lift valve 84 from its seat to meter the flow of liquid refrigerant to the evaporator 38 in the usual manner. When the compressor 34 stops, the valve 84 due to cut away portion 86, permits the pressures on the high and low sides of the system to equalize since refrigerant vapors are free to pass through the cracked valve. The unloading takes place in a matter of seconds and permits an easier start of the engine 26.

For air conditioning of compartment 20 by heating, valve 62 is set to close conduit 48 to flow therethrough to compressor 34 and valve 60 is set to close restricted conduit 52 to flow therethrough and open conduit 50. When the engine 26 is running and compressor 34 is coupled thereto by magnetic clutch 42, the large body of liquid refrigerant in receiver 46 is driven off by heater 54 and hot gaseous refrigerant is delivered directly to heater 38 through unrestricted conduit 58. The hot refrigerant flows through heater 38 giving up its heat to the air passing thereover and then flows through coil 69 where the refrigerant is again heated by the waste heat from the engine exhaust 54. From coil 38 the refrigerant enters receiver 46 from which it flows to the heated coil 56, the heater 54 effecting a hydrostatic pressure to maintain circulating of the gaseous refrigerant. During such heating operation fan 74 aids to draw air into compartment 20 over coil 38 and discharge the air into passenger compartment 20 through discharge 76. If recirculation of the passenger compartment 20 over coil 38 is desired, damper 72 is opened. By means of switch 44, the system may be started or stopped, as desired. During heating operation the clutch 42 disconnects compressor 34 from engine 26.

During heating operation liquid refrigerant is condensed in the coil 38 and this liquid drains from receiver 46 through restricted conduit 57 into coil 56 to be vaporized and since conduit 58 is unrestricted at this time the vaporized refrigerant flows through conduit 58 to be condensed again in coil 38.

During cooling operation the refrigerant is evaporated in coil 38 and the evaporated refrigerant and any liquid in coil 38 flows into the receiver 46. At this time the refrigerant flows into the receiver 46. At this time the compressor is in operation and withdraws the vapor from the receiver through conduit 62. During cooling operation the valve 60 closes off conduit 58 and any refrigerant trapped therein will be heated and tend to pass through the restricted conduit 57 however any liquid in the receiver and conduit 57 prevents such passage with the result that the liquid will surge slightly in the restricted conduit 57 thus preventing heated refrigerant entering the receiver 46.

From the foregoing description, it will be understood that I have provided for motor vehicles an improved air conditioning system of the type using a volatile refrigerant, adapted for use either to cool or to heat the passenger compartment. Also, it will be seen that I have provided an air conditioning system which uses a volatile refrigerant both for cooling and heating operations and by which I obtain comfort heating by applying extraneous heat to the system without restriction of flow to the air heater whereby the air heater is at high temperature. In addition, it will be appreciated that by using extraneous heat and heating the refrigerant to a higher temperature than any prevailing in the system and not restricting flow of the heated refrigerant between the heat source and the air heater that I provide for comfort heating of compartment 20 without need of increasing the capacity of the combined heating and cooling coil over that required for cooling, thus effecting a saving of installation space.

Although a preferred form has been illustrated and described in detail, it will be apparent to those skilled in the art that various other modifications may be made therein without departing from the spirit of the invention or from the scope of the appended claims.

I claim:

1. In an air conditioning system for conditioning the air of a motor vehicle passenger compartment, a combined cooling and heating coil, a refrigerant condenser supplying liquid refrigerant to the inlet of said coil, means controlling the flow of the refrigerant from said condenser to said coil, a refrigerant compressor delivering compressed refrigerant to said condenser, a refrigerant receiver connected to the outlet of said coil, a conduit connecting said receiver to the suction intake of said compressor, a valve in said conduit, a fixed restriction conduit connected to said receiver, an unrestricted conduit connected to said restriction conduit and by-passing said compressor to conduct refrigerant directly from the receiver to the inlet of said coil to effect substantially equal pressures in the conduit and coil, a heater heating said unrestricted conduit to a temperature higher than any temperature prevailing in the system, and inducing refrigerant circulation between said coil, receiver and conduit, and valve means controlling flow of refrigerant through said unrestricted conduit into said coil.

2. In an air conditioning system for conditioning the air of a motor vehicle passenger compartment, a combined cooling and heating coil over which air flows enroute to the passenger compartment, a refrigerant condenser communicating with the inlet of said coil to supply liquid refrigerant thereto on cooling operation of the system, means controlling the flow of refrigerant from said condenser to said coil, a refrigerant compressor connected to deliver compressed refrigerant to said condenser on cooling operation of the system, a refrigerant receiver connected to the outlet of said coil and to the suction intake of said compressor, a heat absorber heated by the exhaust heat of the vehicle engine having a restricted inlet connected to said receiver, a valve controlled unrestricted conduit connecting the outlet of said heat absorber directly to the inlet of said coil and unrestricted to flow to effect substantially the same heating pressures at the heat absorber and coil, valve means to stop flow from said condenser to said coil, and open said unrestricted conduit to flow, and valve means to stop flow from said receiver to said compressor during the heating operation.

3. Air conditioning apparatus comprising a prime mover, a compressor operated by said prime mover, a condenser connected to said compressor, a combined cooling and heating coil connected to said condenser, a receiver connected to the outlet of said coil, a conduit connecting said receiver to the suction intake of said compressor, a valve connected in said conduit, a conduit having a valve at one end and continuously restricted at the other end with the valve controlled end being connected to said coil and the restricted end being connected to said receiver, and a heating element positioned in heat exchange relation to said restricted conduit intermediate the ends thereof.

References Cited in the file of this patent
UNITED STATES PATENTS

| | | |
|---|---|---|
| 2,017,579 | Anderson | Oct. 15, 1935 |
| 2,243,478 | Knoy | May 27, 1941 |
| 2,756,970 | Hermann | July 31, 1956 |